United States Patent [19]

Gottschalk et al.

[11] Patent Number: 5,561,193
[45] Date of Patent: Oct. 1, 1996

[54] POLYPHENYLENE ETHER/POLYAMIDE MOLDING MATERIALS

[75] Inventors: Axel Gottschalk, Neustadt; Herbert Fisch, Wachenheim; Gunter Pipper, Bad Dürkheim; Martin Weber, Neustadt, all of Germany

[73] Assignee: BASF Aktiengesellschaft, Ludwigshafen, Germany

[21] Appl. No.: 422,872

[22] Filed: Apr. 17, 1995

[30] Foreign Application Priority Data

Apr. 22, 1994 [DE] Germany .................. 44 14 044.4

[51] Int. Cl.$^6$ .................. C08L 77/00; C08L 67/00
[52] U.S. Cl. .................. 525/63; 524/504; 524/505; 524/508; 524/514; 524/538; 525/66; 525/92 B; 525/133; 525/391; 525/397
[58] Field of Search .................. 525/92 B, 63, 525/66, 133, 391, 397; 524/504, 505, 508, 514, 538

[56] References Cited

U.S. PATENT DOCUMENTS

| | | | |
|---|---|---|---|
| 4,957,965 | 9/1990 | Taubitz et al. | 525/66 |
| 4,990,564 | 2/1991 | Taubitz et al. | 525/66 |
| 5,073,620 | 12/1991 | Sanada et al. | 525/68 |

FOREIGN PATENT DOCUMENTS

| | | |
|---|---|---|
| 320725 | 6/1989 | European Pat. Off. . |
| 232363 | 4/1990 | European Pat. Off. . |
| 510383 | 10/1992 | European Pat. Off. . |

*Primary Examiner*—Ana L. Carrillo
*Attorney, Agent, or Firm*—Keil & Weinkauf

[57] ABSTRACT

Thermoplastic molding materials contain

A) from 5 to 95% by weight of a partly aromatic, semicrystalline copolyamide composed essentially of $a_1$) from 30 to 44 mol % of units which are derived from terephthalic acid $a_2$) from 6 to 20 mol % of units which are derived from isophthalic acid $a_3$) from 43 to 49.5 mol % of units which are derived from hexamethylenediamine and $a_4$) from 0.5 to 7 mol % of units which are derived from aliphatic cyclic diamines of 6 to 30 carbon atoms, the molar percentages of components $a_1$) to $a_4$) together being 100%, and B) from 5 to 95% by weight of a polyphenylene ether C) from 0 to 30% by weight of an elastomeric polymer, D) from 0 to 45% by weight of a fibrous or particulate filler or of a mixture thereof, E) from 0 to 20% by weight of a flameproofing agent and F) from 0 to 30% by weight of conventional additives and processing assistants,
the percentages A) to F) summing to 100%.

9 Claims, No Drawings

POLYPHENYLENE ETHER/POLYAMIDE MOLDING MATERIALS

The present invention relates to thermoplastic molding materials containing

A) from 5 to 95% by weight of a partly aromatic, semicrystalline copolyamide composed essentially of $a_1$) from 30 to 44 mol % of units which are derived from terephthalic acid $a_2$) from 6 to 20 mol % of units which are derived from isophthalic acid $a_3$) from 43 to 49.5 mol % of units which are derived from hexamethylenediamine and $a_4$) from 0.5 to 7 mol % of units which are derived from aliphatic cyclic diamines of 6 to 30 carbon atoms, the molar percentages of components $a_1$) to $a_4$) together being 100%, and B) from 5 to 95% by weight of a polyphenylene ether C) from 0 to 30% by weight of an elastomeric polymer, D) from 0 to 45% by weight of a fibrous or particulate filler or of a mixture thereof, E) from 0 to 20% by weight of a flameproofing agent and F) from 0 to 30% by weight of conventional additives and processing assistants, the percentages A) to F) summing to 100%.

The present invention furthermore relates to the use of these molding materials for the production of moldings of any type and to the moldings obtainable therefrom.

Molding materials comprising polyphenylene ether (PPE) and polyamide (PA) are known.

EP-A 232 363 discloses blends of a PPE modified by reaction with maleic anhydride in the melt, aliphatic polyamides and an impact modifier. EP-A 400 418 discloses PPE/PA blends which contain an ethylene copolymer having a specific structure as an impact modifier. These products have satisfactory impact strength but it is desirable to improve the heat distortion resistance and to reduce the shrinkage.

Blends of modified PPE and a partly aromatic, semicrystalline polyamide having a certain composition are disclosed in EP-A 320 725 and EP-A 510 383. In some applications, for example automotive moldings, great toughness is required in combination with good processability. The toughness of products obtained according to the stated publications is not sufficient in this area.

It is an object of the present invention to provide thermoplastic molding materials of polyphenylene ethers and polyamide, which have very good abrasion resistance and high heat distortion resistance, the good mechanical properties, such as toughness (in particular multiaxial impact strength) and rigidity being retained.

We have found that this object is achieved, according to the invention, by the thermoplastic molding materials defined at the outset. Preferred materials of this type are described in the subclaims.

The novel molding materials contain, as component A), a partly aromatic semicrystalline thermoplastic copolyamide in amounts of from 50 to 95, preferably from 15 to 75, in particular from 25 to 65, % by weight, composed essentially of $a_1$) from 30 to 44, preferably from 32 to 40, in particular from 32 to 38, mol % of units which are derived from terephthalic acid, $a_2$) from 6 to 20, preferably from 10 to 18, in particular from 12 to 18, mol % of units which are derived from isophthalic acid, $a_3$) from 43 to 49.5, preferably from 46 to 48.5, in particular from 46.3 to 48.2, mol % of units which are derived from hexamethylenediamine, and $a_4$) from 0.5 to 7, preferably from 1.5 to 4, in particular from 1.8 to 3.7, mol % of units which are derived from aliphatic cyclic diamines of 6 to 30, preferably 13 to 29, in particular 13 to 17, carbon atoms, the molar percentages of components $a_1$) to $a_4$) together being 100%.

The diamine units $a_3$) and $a_4$) are preferably reacted in equimolar amounts with the dicarboxylic acid units $a_1$) and $a_2$).

Suitable monomers $a_4$) are preferably cyclic diamines of the formula

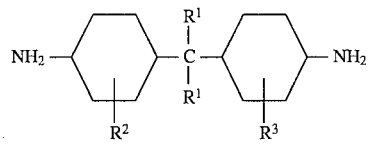

where $R^1$ is hydrogen or $C_1$–$C_4$-alkyl and $R^2$ and $R_3$ are each $C_1$–$C_4$-alkyl or hydrogen.

Particularly preferred diamines $a_4$) are bis(4-aminocyclohexyl)methane, bis(4-amino-3-methylcyclohexyl)methane, 2,2-bis(4-aminocyclohexyl)propane and 2,2-bis(4-amino-3-methylcyclohexyl)propane.

Examples of further monomers $a_4$) are 1,3- and 1,4-cyclohexanediamine and isophoronediamine.

In addition to the units $a_1$) to $a_4$) described above, the partly aromatic copolyamides A) may contain up to 4, preferably up to 3.5, % by weight (based on $a_1$) to $a_4$)) of further polyamide-forming monomers $a_5$), such as those known for other polyamides.

Aromatic dicarboxylic acids as) are of 8 to 16 carbon atoms. Examples of suitable aromatic dicarboxylic acids are substituted terephthalic and isophthalic acids, such as 3-tert-butylisophthalic acid, polynuclear dicarboxylic acids, e.g. 4,4'- and 3,3'-biphenyldicarboxylic acid, 4,4'- and 3,3'-diphenylmethanedicarboxylic acid, 4,4'- and 3,3'-dicarboxyphenyl sulfone, 1,4- and 2,6-naphthalenedicarboxylic acid and phenoxyterephthalic acid.

Further polyamide-forming monomers as) may be derived from dicarboxylic acids of 4 to 16 carbon atoms and aliphatic diamines of 4 to 16 carbon atoms and from aminocarboxylic acids or corresponding lactams of 7 to 12 carbon atoms. Merely as examples of suitable monomers of these types, suberic acid, azelaic acid or sebacic acid may be mentioned as typical aliphatic dicarboxylic acids, 1,4-butanediamine, 1,5-pentanediamine or piperazine as typical diamines and caprolactam, capryllactam, onantholactam, ω-aminoundecanoic acid and laurolactam as typical lactams or aminocarboxylic acids.

Partly aromatic copolyamides whose triamine content is less than 0.5, preferably less than 0.3, % by weight have also proven particularly advantageous.

Partly aromatic copolyamides prepared by most known processes (cf. U.S. Pat. No. 4,603,166) have triamine contents of more than 0.5% by weight, which leads to a deterioration in the product quality and to problems in the continuous production. A particular example of a triamine which gives rise to these problems is dihexamethylenetriamine, which is formed from the hexamethylenediamine used in the preparation.

Copolyamides having a low triamine content have, at the same solution viscosity, lower melt viscosities compared with products of the same composition which have a higher triamine content. This considerably improves both the processibility and the product properties.

The melting points of the partly aromatic copolyamides are from 290° to 340° C., preferably from 292° to 330° C., this melting point being associated with a high glass transition temperature of, as a rule, more than 120° C., in particular more than 130° C. (in the dry state).

According to the invention, the partly aromatic copolyamides should be understood as meaning those which a crystallinity of >30%, preferably >35%, in particular >40%.

The crystallinity is a measure of the fraction of crystalline fragments in the copolyamide and is determined by X-ray diffraction or indirectly by measuring $\Delta H_{cryst.}$.

Mixtures of the partly aromatic copolyamides can of course also be used, any desired mixing ratio being possible.

Suitable processes for the preparation of the novel copolyamides are known to a person skilled in the art.

The batch process (batchwise production) may be mentioned as a preferred method of preparation. The aqueous monomer solution is heated to 280°–340° C. in the course of from 0.5 to 3 hours in an autoclave, a pressure of from 10 to 50, in particular from 15 to 40, bar being reached, which is kept very constant for up to 2 hours by releasing excess steam. The autoclave is then let down at constant temperature in the course of from 0.5 to 2 hours until a final pressure of from 1 to 5 bar has been reached. The polymer melt is then discharged, cooled and granulated.

Another preferred process is carried out similarly to the processes described in EP-A 129 195 and 129 196.

In these processes, an aqueous solution of the monomers $a_1$) to $a_4$) and, if required, as), having a monomer content of from 30 to 70, preferably from 40 to 65, % by weight, is heated to 280°–330° C. in the course of less than 60 seconds under superatmospheric pressure (from 1 to 10 bar) and with simultaneous evaporation of water and formation of a prepolymer, prepolymers and vapor are then continuously separated, the vapor is rectified and the entrained diamines are recycled. Finally, the prepolymer is passed into a polycondensation zone and is subjected to polycondensation at from 1 to 10 bar and from 280° to 330° C. for a residence time of from 5 to 30 minutes. Of course, the temperature in the reactor is above the melting point, required at the particular steam pressure, of the resulting prepolymer.

As a result of these short residence times, the formation of triamines is substantially prevented.

The resulting polyamide prepolymer, which as a rule has a viscosity number of from 40 to 70, preferably from 40 to 60, ml/g, measured in a 0.5% strength by weight solution in 96% strength sulfuric acid at 25° C., is removed continuously from the condensation zone.

In a preferred procedure, the resulting polyamide prepolymer is passed in molten form through a discharge zone with simultaneous removal of the residual water contained in the melt. Suitable discharge zones are, for example, devolatilization extruders. The melt freed in this manner from the water is then extruded and the extrudate is granulated.

In a particularly preferred embodiment, it is also possible to add the components B) and, if required, C) to F) to the prepolymer of component A) in the devolatilization extruder itself, in which case said extruder is usually equipped with suitable mixing elements, such as kneading blocks. The product is then likewise extruded, cooled and granulated.

These granules are subjected to continuous or batchwise solid-phase condensation under an inert gas at below the melting point, for example from 170° to 240° C., until the desired viscosity is obtained. For example, tumbler dryers may be used for the batchwise solid-phase condensation and heating tubes through which hot inert gas flows may be employed for the continuous solid-phase condensation. The continuous solid-phase condensation is preferred, the inert gas used being nitrogen or in particular superheated steam, advantageously the steam obtained at the top of the column.

The viscosity number after the solid-phase postcondensation or the other abovementioned preparation processes is in general from 100 to 500, preferably from 110 to 200, ml/g, measured in a 0.5% strength by weight solution in 96% strength sulfuric acid at 25° C.

The novel molding materials contain, as component B), from 5 to 95, preferably from 20 to 80, in particular from 20 to 60, % by weight of a polyphenylene ether. Unmodified polyphenylene ethers or modified polyphenylene ethers and mixtures thereof may be used. Modified polyphenylene ethers and mixtures with unmodified polyphenylene ethers which contain from 55 to 95% by weight (based on B) of a modified polyphenylene ether are preferred.

The polyphenylene ethers have in general a weight average molecular weight of from 10,000 to 80,000, preferably from 20,000 to 60,000.

This corresponds to a reduced specific viscosity $\eta_{red}$ of from 0.2 to 0.9, preferably from 0.35 to 0.8, dl/g, measured in a 1% strength by weight solution in chloroform at 25° C. according to DIN 53 726.

The unmodified polyphenylene ethers $b_1$) are known per se and are preferably prepared by oxidative coupling of phenols disubstituted in the o position.

Examples of substituents are halogen, such as chlorine or bromine, and alkyl of 1 to 4 carbon atoms which preferably has no $\alpha$ tertiary hydrogen atom, for example methyl, ethyl, propyl or butyl. The alkyl radicals may in turn be substituted by halogen, such as chlorine or bromine, or by hydroxyl. Further examples of possible substituents are alkoxy, preferably of up to 4 carbon atoms, or phenyl which is unsubstituted or substituted by halogen and/or by alkyl. Copolymers of different phenols, for example copolymers of 2,6-dimethylphenol and 2,3,6-trimethylphenol, are also suitable. Mixtures of different polyphenylene ethers may of course also be used.

Preferably used polyphenylene ethers are those which are compatible with vinylaromatic polymers, i.e. completely or very substantially soluble in these polymers (cf. A. Noshay, Block Copolymers, pages 8 to 10, Academic Press, 1977, and O. Olabisi, Polymer-Polymer Miscibility, 1979, pages 117 to 189).

Examples of polyphenylene ethers are poly(2,6-dilauryl-1,4-phenylene ether), poly(2,6-diphenyl-1,4-phenylene ether), poly(2,6-dimethoxy-1,4-phenylene ether), poly(2,6-diethoxy- 1,4-polyphenylene ether), poly(2-methoxy-6-ethoxy-1,4-phenylene ether), poly(2-ethyl-6-stearyloxy-1,4-phenylene ether), poly( 2,6-dichloro-1,4-phenylene ether), poly(2-methyl-6-phenyl- 1,4-phenylene ether), poly(2,6-dibenzyl-1,4-phenylene ether), poly(2-ethoxy-1,4-phenylene ether), poly(2-chloro-1,4-phenylene ether) and poly(2,5-dibromo-1,4-phenylene ether). Preferably used polyphenylene ethers are those in which the substituents are alkyl of 1 to 4 carbon atoms, such as poly(2,6-dimethyl-1, 4-phenylene ether), poly(2,6-diethyl-1,4-phenylene ether), poly(2-methyl-6-ethyl-1,4-phenylene ether), poly(2-methyl-6-propyl- 1,4-phenylene ether), poly(2, 6-dipropyl-1,4-phenylene ether) and poly(2-ethyl-6-propyl-1,4-phenylene ether).

Graft copolymers of polyphenylene ethers and vinylaromatic monomers, such as styrene, $\alpha$-methylstyrene, vinyltoluene and chlorostyrene, are also suitable.

Functionalized or modified polyphenylene ethers B) are known per se, for example from WO-A 86/02086, WO-A 87/00540, EP-A-22 245, EP-A-223 116 and EP-A-254 048.

The polyphenylene ether $b_1$) is usually modified by incorporating at least one carbonyl, carboxyl, anhydride, amido, imido, carboxylic ester, carboxylate, amino, hydroxyl, epoxy, oxazoline, urethane, urea, lactam or halobenzyl group, so that sufficient compatibility with the 2nd polymer of the blend, the polyamide, is ensured.

The modification is carried out in general by reacting a polyphenylene ether $b_1$) with a modifier, which contains at least one of the abovementioned groups, in solution (WO-A 86/2086), in aqueous dispersion, in a gas-phase process (EP-A 25 200) or in the melt, in the presence or absence of suitable vinylaromatic polymers or impact modifiers, it being possible for free radical initiators to be present.

Suitable modifiers (b3) are, for example, maleic acid, methylmaleic acid, itaconic acid, tetrahydrophthalic acid, their anhydrides and imides, fumaric acid, the mono- and diesters of these acids, for example with $C_1$- and $C_2$-$C_8$-alkanols (monomers $b_{31}$), the mono- or aiamides of these acids, such as N-phenylmaleimide (monomers $b_{32}$) and maleic hydrazide. Further modifiers are the acyl chloride of trimellitic anhydride, benzene-1,2-dicarboxylic anhydride 4-carboxylic acid-acetic anhydride, chloroethanoylsuccinaldehyde, chloroformylsuccinaldehyde, citric acid and hydroxysuccinic acid. Examples of monomers $b_{33}$) are N-vinylpyrrolidone and (meth)acryloylcaprolactam.

A modified polyphenylene ether which is preferably used as component B) in the novel molding materials is one which is obtainable by reacting $b_1$) from 50 to 99.95% by weight of an unmodified polyphenylene ether $b_2$) from 0 to 40% by weight of a vinylaromatic polymer $b_3$) from 0.05 to 30% by weight of at least one compound selected from the group consisting of
  $b_{31}$) an $\alpha,\beta$-unsaturated dicarbonyl compound,
  $b_{32}$) an amido-containing monomer having a polymerizable double bond and
  $b_{33}$) a lactam-containing monomer having a polymerizable double bond, and $b_4$) from 0 to 5% by weight of a free radical initiator,
the percentages by weight being based on the sum of $b_1$) to $b_4$), in the course of from 0.5 to 15 minutes at from 240° to 375° C. in a suitable mixing and kneading apparatus, such as a twin-screw extruder.

The vinylaromatic polymer ($b_2$) should preferably be compatible with the polyphenylene ether used. Up to 50, preferably up to 40, % by weight, based on B), of the polyphenylene ether B) may be replaced by a vinylaromatic polymer.

The molecular weight of these polymers known per se is in general from 1,500 to 2,000,000, preferably from 70,000 to 1,000,000, particularly preferably from 75,000 to 200,000.

Examples of preferred vinylaromatic polymers compatible with polyphenylene ethers are given in the abovementioned monograph by Olabisi, pages 224 to 230 and 245. Vinylaromatic polymers of styrene, chlorostyrene, $\alpha$-methylstyrene and p-methylstyrene are mentioned here merely as typical examples; minor amounts (preferably not more than 20, in particular not more than 8, % by weight) of comonomers, such as (meth)acrylonitrile or (meth)acrylates, may also be present in the composition. Particularly preferred vinylaromatic polymers are polystyrene and toughened polystyrene. Mixtures of these polymers can of course also be used. The preparation is preferably carried out by the process described in EP-A-302 485.

Examples of free radical initiators ($b_4$) are:
Di-(2,4-dichlorobenzoyl) peroxide, tert-butyl peroxide, di-(3,5,5-trimethylhexanol) peroxide, dilauroyl peroxide, didecanoyl peroxide, dipropionyl peroxide, dibenzoyl peroxide, tert-butyl peroxy-2-ethylhexanoate, tert-butyl peroxydiethylacetate, tert-butyl peroxyisobutyrate, 1,1-di-tert-butyl peroxy-2,3,5-trimethylcyclohexane, tert-butyl peroxyisopropylcarbonate, tert-butyl peroxy-3,3,5-trimethylhexoate, tert-butyl peracetate, tert-butyl perbenzoate, butyl 4,4-di-tert-butylperoxyvalerate, 2,2-di-tert-butylperoxybutane, dicumyl peroxide, tert-butyi cumyl peroxide, 1,3-di(tert-butylperoxyisopropyl)benzene and di-tert-butyl peroxide. Organic hydroperoxides, such as diisopropylbenzene monohydroperoxide, cumyl hydroperoxide, tert-butyl hydroperoxide, p-methyl hydroperoxide and pinane hydroperoxide, and highly branched alkanes of the general structure

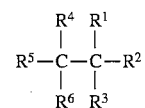

where $R^1$ to $R^6$ are each alkyl of 1 to 8 carbon atoms, alkoxy of 1 to 8 carbon atoms, aryl, such as phenyl or naphthyl, or 5-membered or 6-membered heterocyclic structures having a $\pi$ electron system and nitrogen, oxygen or sulfur as hetero atoms, may also be mentioned. $R^1$ to $R^6$ may in turn contain functional groups as substituents, such as carboxyl, carboxyl derivative, hydroxyl, amino, thiol or epoxy groups. Examples are 2,3-dimethyl-2,3-diphenylbutane, 3,4-dimethyl-3,4-diphenylhexane and 2,2,3,3-tetraphenylbutane.

In addition to the essential components A) and B), the novel molding materials may contain from 0 to 30, preferably from 5 to 20, in particular from 5 to 15, % by weight of an elastomeric polymer. Conventional impact modifiers C) which are suitable for polyamides (component A) and rubbers C) which conventionally toughen polyphenylene ethers B) may be used.

The conventional impact-modifying-polymers (also referred to as impact modifiers, elastomers or rubbers) which are used for toughening polyamides or polyphenylene ethers are used as component C).

Examples of rubbers which increase the toughness of the polyphenylene ethers are:

Polyoctenylenes, graft rubbers having a crosslinked, elastomeric core which is derived, for example, from butadiene, isoprene or alkyl acrylates and a graft shell comprising polystyrene, and furthermore copolymers of ethylene and acrylates or methacrylates and the ethylene/propylene (EP) and ethylene/propylene/diene (EPDM) rubbers, and the EP and EPDM rubbers grafted with styrene.

Block copolymers having up to six, preferably up to four, identical or different blocks, which may be linked both linearly and in the form of a star (ie. radial block copolymers) have proven particularly suitable.

Block rubbers in which at least one block, preferably a terminal block, is composed of vinylaromatic monomers, such as styrene, $\alpha$-methylstyrene, vinyltoluene, vinylnaphthalene or isopropenylnaphthalene, are preferred. A particularly preferred vinylaromatic block is polystyrene.

Usually, these preferred block copolymers furthermore contain an elastomeric block which is characterized by a glass transition temperature of less than 0° C., preferably less than −30° C. This block is derived, for example, from conjugated dienes, such as butadiene, isoprene, 1,3-pentadiene or 2,3-dimethylbutadiene. In order to obtain products having good continuous heat distortion resistance, it has proven particularly suitable to hydrogenate at least 50%, preferably at least 80%, in particular at least 90%, of the double bonds.

The transitions between the individual blocks may be clearly defined or tapered.

The rubbers which increase the toughness of polyphenylene ethers are preferably linear block copolymers of the general structure A—A, A—B—A' or A—B—A'—B', where A and A' are each a vinylaromatic block, preferably polystyrene, and B and B' are each an elastomeric block which is preferably composed of butadiene and/or isoprene, where both butadiene and isoprene may be hydrogenated.

Mixtures of block copolymers having different structures, for example mixtures of two-block and three-block copolymers or of hydrogenated and unhydrogenated block copolymers may also De used.

Polymers toughened in this manner are known per se and are described in the literature. Merely by way of example, reference may be made here to U.S. Pat. No. 4,085,163, U.S. Pat. No. 4,041,103, U.S. Pat. No. 3,149,182, U.S. Pat. No. 3,231,635 and U.S. Pat. No. 3,462,162.

Appropriate products are also commercially available, for example a polyoctylene having the name Vestenamer® (Hüls AG), and a large number of suitable block copolymers having at least one vinylaromatic and one elastomeric block. Examples are the Cariflex® TR grades (Shell), the Kraton® G grades (Shell), the Finaprene® grades (Fina) and the Europrene® SOL-TR grades (Enichem).

Rubbers which increase the toughness of polyamides generally have two essential features: they contain an elastomeric component which has a glass transition temperature of less than $-10°$ C., preferably less than $-30°$ C., and at least one functional group which can react with the polyamide. Suitable functional groups are, for example, carboxyl, anhydride, carboxylic ester, carboxamido, carboximido, amino, hydroxyl, epoxy, urethane and oxazoline groups.

Examples of rubbers which increase the toughness of polyamides are:

EP and EPDM rubbers which have been grafted with the abovementioned functional groups. Suitable graft reagents are, for example, maleic anhydride, itaconic acid, acrylic acid, glycidyl acrylate and glycidyl methacrylate. These monomers may be grafted onto the polymer in the melt or in solution, in the presence or absence of a free radical initiator, such as cumyl hydroperoxide.

Copolymers of α-olefins may also be mentioned. The α-olefins are usually monomers of 2 to 8 carbon atoms, preferably ethylene and propylene. Comonomers which have proven suitable are alkyl acrylates or alkyl methacrylates which are derived from alcohols of from 1 to 8 carbon atoms, preferably from ethanol, butanol or ethylhexanol, and reactive comohomers, such as acrylic acid, methacrylic acid, maleic acid, maleic anhydride or glycidyl (meth)acrylate, and vinyl esters, in particular vinyl acetate. Mixtures of different comohomers may also be used. Copolymers of ethylene with ethyl or butyl acrylate and acrylic acid and/or maleic anhydride have proven particularly suitable.

The copolymers can be prepared in a high pressure process at from 400 to 4,500 bar or by grafting the comonomers onto the poly-α-olefin. The amount of α-olefin in the copolymer is in general from 99.95 to 55% by weight.

A further group of suitable elastomers comprise core/shell graft rubbers. These are graft rubbers which are prepared in emulsion and consist of at least one hard and one soft component. A hard component is usually understood as meaning a polymer having a glass transition temperature of not less than 25° C., while a soft component is understood as meaning a polymer having a glass transition temperature of not more than 0° C. These products have a structure comprising a core and at least one shell, the structure being determined by the order of addition of the monomers. The soft components are derived in general from butadiene, isoprene, alkyl acrylates or alkyl methacrylates and, if required, further comonomers. Examples of suitable comonomers here are styrene, acrylonitrile and crosslinking or graft-linking monomers having more than one polymerizable double bond, such as diallyl phthalate, divinylbenzene, butanediol diacrylate or triallyl (iso)cyanurate. The hard components are derived in general from styrene, α-methylstyrene and copolymers thereof, examples of preferred comonomers here being acrylonitrile, methacrylonitrile and methyl methacrylate.

Preferred core/shell graft rubbers contain a soft core and a hard shell or a hard core, a first soft shell and at least one further hard shell. Functional groups, such as carbonyl, carboxyl, anhydride, amido, imido, carboxylic ester, amino, hydroxyl, epoxy, oxazoline, urethane, urea, lactam or halobenzyl, are preferably incorporated here by adding suitably functionalized monomers during the polymerization of the final shell. Suitable functionalized monomers are, for example, maleic acid, maleic anhydride, mono-or diesters of maleic acid, tert-butyl (meth)acrylate, acrylic acid, glycidyl (meth)acrylate and vinyloxazoline. The amount of monomers having functional groups is in general from 0.1 to 25, preferably from 0.25 to 15, % by weight, based on the total weight of the core/shell graft rubbers. The weight ratio of soft to hard components is in general from 1:9 to 9:1, preferably from 3:7 to 8:2.

Such rubbers which increase the toughness of polyamides are known per se and are described, for example, in EP-A 208 187.

A further group of suitable impact modifiers comprises thermoplastic polyester elastomers. Polyester elastomers are understood as meaning segmented copolyetheresters which contain long-chain segments which are derived as a rule from poly(alkylene)ether glycols and short-chain segments which are derived from low molecular weight diols and dicarboxylic acids. Such products are known per se and are described in the literature, for example in U.S. Pat. No. 3,651,014. Corresponding products are also commercially available under the names Hytrel® (Du Pont), Arnitel® (Akzo) and Pelprene® (Toyobo Co. Ltd.).

Mixtures of different rubbers can of course also be used.

The novel molding materials may contain, as component D), from 0 to 45, preferably from 0 to 35, % by weight of fibrous or particulate fillers or mixtures thereof. Examples of fillers are carbon fibers or glass fibers in the form of woven glass fabrics, glass mats, glass rovings or glass beads and wollastonite.

Preferred fibrous reinforcing materials (component D) are carbon fibers, potassium titanate whiskers, aramid fibers and particularly preferably glass fibers. When glass fibers are used, they may be provided with a size and an adhesion promoter to improve the compatibility with the thermoplastic polyamide (A) or with the modified polyphenylene ether (B). In general, the carbon fibers and glass fibers used have a diameter of from 6 to 20 µm.

These glass fibers can be incorporated both in the form of short glass fibers and in the form of rovings. In the prepared injection molding, the average length of the glass fibers is preferably from 0.08 to 0.5 mm.

Suitable particulate fillers (component D) are amorphous silica, magnesium carbonate (chalk), powdered quartz, mica, talc, feldspar and in particular calcium silicates, such as wollastonite and kaolin (in particular calcined kaolin).

Preferred combinations of fillers are, for example, 20% by weight of glass fibers with 15% by weight of wollastonite and 15% by weight of glass fibers with 15% by weight of wollastonite.

The novel molding materials may furthermore contain flameproofing agents E) in amounts of from 0 to 20, preferably up to 12, % by weight, based on the total weight of the molding materials.

All known flameproofing agents are suitable, for example polyhalobiphenyl, polyhalodiphenyl ether, polyhalophthalic acid and its derivatives, polyhalooligo- and polycarbonates, the corresponding bromine compounds being particularly effective.

Examples of these are polymers of 2,6,2',6'-tetrabromobisphenol A, of tetrabromophthalic acid, of 2,6-dibromophenol and of 2,4,6-tribromophenol and of derivatives thereof.

A preferred flameproofing agent E) is elemental red phosphorus. As a rule, the elemental phosphorus may be desensitized or coated with, for example, polyurethanes or other aminoplasts. Masterbatches of red phosphorus, for example in a polyamide, elastomer or polyolefin, are also suitable.

1,2,3,4,7,8,9,19,13,13,14,14-Dodecachloro- 1,4,4a,5,6,6a,7,10,10a,11,12,12a-dodecahydro-1,4:7,10-dimethanodibenzo[a,e]cyclooctane (Dechlorane®Plus, Occidental Chemical Corp.) is particularly preferred, if necessary together with a synergistic agent, for example antimony trioxide.

Further preferred phosphorus compounds are organophosphorus compounds such as phosphonates, phosphinates, phosphinites, phosphine oxides, phosphines, phosphites or phosphates. An example is triphenylphosphine oxide. This may be used alone or mixed with red phosphorus and, if required, antimony oxide.

Typical preferred phosphorus compounds are those of the following general formula

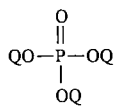

where the radicals Q are hydrogen or identical or different hydrocarbon radicals or halohydrocarbon radicals, such as alkyl, cycloalkyl, aryl, alkyl-substituted aryl or aryl-substituted alkyl, provided that at least one of the radicals Q is aryl. Examples of such suitable phosphates are the following: phenyl bisdodecyl phosphate, phenyl bisneopentyl phosphate, phenyl ethylene hydrogen phosphate, phenyl bis(3,5,5'-trimethylhexyl) phosphate, ethyl diphenyl phosphate, 2-ethylhexyl di(p-toluyl) phosphate, diphenyl hydrogen phosphate, bis(2-ethylhexyl) phenyl phosphate, tri(non-Flphenyl) phosphate, phenyl methyl hydrogen phosphate, didodecyl p-tolyl phosphate, tricresyl phosphate, triphenyl phosphate, dibutyl phenyl phosphate and diphenyl hydrogen phosphate. The preferred phosphates are those in which each radical Q is aryl. The most preferable phosphate is triphenyl phosphate. The combination of triphenyl phosphate with red phosphorus is also preferred.

Other suitable flameproofing agents are compounds which contain phosphorus-nitrogen bonds, such as phosphonitrile chloride, phosphoric ester amides, phosphoric ester amines, phosphoramides, phosphonamides, phosphinamides, tris(aziridinyl)phosphine oxide or tetrakis(hydroxymethyl)phosphonium chloride. These flame-retardant additives are for the most part commercially available.

Further halogen-containing flameproofing agents are tetrabromobenzene, hexachlorobenzene and hexabromobenzene and halogenated polystyrenes and polyphenylene ethers.

The halogenated phthalimides described in DE-A-19 46 924 may also be used. Among these, N,N'-ethylenebistetrabromophthalimide has become particularly important.

In addition to the essential components A) and B) and, if required, C) to E), the novel molding materials may contain conventional additives and processing assistants F). The amount of these is in general up to 30, preferably up to 10, % by weight, based on the total weight of the components A) to F).

Conventional additives are, for example, stabilizers and antioxidants, heat stabilizers and UV stabilizers, lubricants and mold release agents, dyes, pigments and plasticizers.

Antioxidants and heat stabilizers which may added to the thermoplastic materials according to the invention are, for example, halides of metals of Group I of the Periodic Table, for example sodium, potassium or lithium halides, if necessary in combination with copper(I) halides, for example chlorides, bromides or iodides. Zinc fluoride and zinc chloride may also be used. Sterically hindered phenols, hydroquinones, substituted members of this group and mixtures of these compounds may furthermore be used, preferably in concentrations of up to 1% by weight, based on the weight of the mixture.

Example of UV stabilizers are various substituted resorcinols, salicylates, benzotriazoles and benzophenones, which are used in general in amounts of up to 2% by weight.

Materials for increasing the shielding against electromagnetic waves, such as metal flakes, metal powders, metal fibers, metal-coated fillers and conductive polymers, may also be present.

Lubricants and mold release agents, which as a rule may be added to the thermoplastic material in amounts of up to 1% by weight, are stearic acid, stearyl alcohol, alkyl stearates and stearamides and esters of pentaerythritol with long-chain fatty acids.

The additives include stabilizers which prevent the decomposition of the red phosphorus in the presence of moisture and atmospheric oxygen. Examples are compounds of cadmium, of zinc, of aluminum, of silver, of iron, of copper, of antimony, of tin, of magnesium, of manganese, of vanadium, of boron and of titanium. Particularly suitable compounds are, for example, oxides of the stated metals, as well as carbonates or basic carbonates, hydroxides and salts of organic or inorganic acids, such as acetates or phosphates and hydrogen phosphates or sulfates, respectively.

The novel thermoplastic molding materials are advantageously obtained by mixing the individual components at from 270 to 350° C. in a conventional mixing apparatus, such as a kneader, a Banbury mill or a single-screw extruder, preferably a twin-screw extruder. Thorough mixing is required in order to obtain a very homogeneous molding material. The order in which the components are mixed may be varied; for example, two or, if required, three components may be premixed, but it is also possible to mix all components together.

It should be noted that, in the preparation of the molding materials, a reaction may take place between the components A) to D), in particular between A) and B), so that a pure mixture of these components is no longer present in the end product.

The novel molding materials are distinguished by their balanced properties, in particular by their good abrasion resistance and high heat distortion resistance.

They are particularly suitable for the production of moldings by injection molding or extrusion, in particular for parts in the automotive sector which are subjected to thermal stress. In the latter application, the fact that, owing to their good heat distortion resistance, the parts produced from the novel molding materials can be coated on line, i.e. without the need for time-consuming and expensive separate coating, is particularly advantageous.

EXAMPLES

Component A)

An about 60% strength aqueous solution consisting of terephthalic acid (32.2 mol %≙37.5% by weight), isophthalic acid (17.8 mol %≙ 20.6% by weight), hexamethylenediamine (48.1 mol %≙39.1% by weight or 1.9 mol %≙2.8% by weight), bis(4-aminocyclohexyl)methane and 0.174 kg of propionic acid and 100 kg of water was conveyed from a heated storage container at about 80° C. at a rate corresponding to 5 kg of polyamide per hour by means of a metering pump into a tubular evaporator arranged partly horizontally and partly vertically. The evaporator was heated by means of a liquid heating medium which was at 326° C., with vigorous circulation. The evaporator had a length of 3 m, a capacity of 180 ml and a heat-transfer surface area of about 1,300 cm$^2$. The residence time in the evaporator was 50 seconds. The mixture of prepolymer and steam emerging from the evaporator was at 310° C. and was separated into steam and melt in a separator. The melt remained in the separator for a further 10 minutes and was then extruded by means of an extruder having a devolatilization zone, solidified in a water bath and then granulated. The separator and the evaporator zone were kept at 5 bar by a pressure-regulating means which was arranged downstream of the column. The steam separated off in the separator was fed to a packed column which had about 10 theoretical plates and to which about 1 l of vapor condensate per hour was added at the top in order to generate a reflux. The resulting temperature at the top of the column was 152° C. The steam emerging after the let-down valve was condensed and contained less than 0.05% by weight of hexamethylenediamine. The bottom product of the column was an aqueous solution of hexamethylenediamine, which contained 80% by weight of hexamethylenediamine based in each case on polyamide produced. This solution was added to the starting salt solution via a pump, once again before the entrance into the evaporator.

After the polymer melt had emerged from the separator, the polyamide had a very pale natural color and a viscosity number of 48 ml/g (measured as a 0.5% strength solution at 25° C. in 96% strength by weight H$_2$SO$_4$ according to DIN 53 246).

The product had roughly equivalent amounts of terminal carboxyl and amino groups.

In the discharge extruder, the melt was let down to atmospheric pressure and underwent virtually no further condensation during a residence time of less than 1 minute.

Thereafter, the product in the solid phase was heated discontinuously at 200° C. in a stationary heating tube (double-walled glass tube which was heated to the required temperature externally by means of oil and had an internal diameter of 120 mm and a length of 1,000 mm and through which 120 l/min of superheated steam flowed) until the viscosity number reached 112 ml/g. The residence time was 23 hours. In the course of this heating, if necessary a major part of the extractable residual monomers was also extracted from the steam.

Composition:
a$_1$) 32.2 mol % or 37.5% by weight
a$_2$) 17.8 mol % or 20.6% by weight
a$_3$) 48.1 mol % or 39.1% by weight
a$_4$) 1.9 mol % or 2.8% by weight The specific heat diffusion $\Delta H_{cryst.}$ was determined as a relative measure of the crystallinity by means of Differential Scanning Calorimetry (DSC 990 from Du Pont) at a heating rate of 20° C./min: 54 J/g.

Component A/1V

A partly aromatic copolyamide according to EP-A 510.383:

5% by weight of units which are derived from terephthalic acid and hexamethylenediamine, 10% by weight of units which are derived from e-caprolactam and 85% by weight of units which are derived from adipic acid and hexamethylenediamine.

The viscosity number (VN) was: 125 ml/g

Component A/2V

A partly aromatic copolyamide according to EP-A 320 725:

70% by weight of units which are derived from terephthalic acid and hexamethylenediamine and 30% by weight of units which are derived from ε-caprolactam.

The VN was: 118 ml/g

Component A/3V

An aliphatic polyamide: polyhexamethyleneadipamide (PA66) having a VN of 130 ml/g.

Component B

The following components were thoroughly mixed in a twin-screw extruder (ZSK 30, Werner and Pfleiderer) at a melt temperature of 320° C. and in an average residence time of 3 minutes:

b$_1$) 98.5% by weight of poly(2,6-dimethyl-1,4-phenylene ether) having an $\eta_{red}$ (reduced viscosity) of 0.65 (measured in a 1% strength by weight solution in chloroform at 25° C.)

b$_3$) 1.45% by weight of fumaric acid b$_4$) 0.05% by weight of 3,4-dimethyl-3,4-diphenylhexane.

The melt was devolatilized and extruded, and the extrudate was passed through a water bath, granulated and dried.

Component C

Kraton® G 1701 (styrene/hydrogenated isoprene block copolymer, 28% of polystyrene, Brookfield viscosity 77° F., 25% strength by weight in toluene=>50,000 cps), from Shell Preparation of the molding materials The amounts of the particular components stated in the tables were mixed in a twin-screw extruder at a barrel temperature of 325° C. (or 280° C. for PA66 (Example 7*)) and at a speed of 200 rpm. The melt was cooled and then granulated. The dried granules were injection molded to give standard small bars.

The multiaxial impact strength (penetration energy PEN) was determined according to DIN 53 443 and the heat distortion resistance (Vicat A) according to DIN 53 460.

Determination of the abrasion resistance (x):

The abrasion resistance was determined by means of a pin-and-disk apparatus. An axially displaceable pin (standard small bar) of the novel molding materials was pressed onto a rotating steel disk under a pressure of 3.14 N/mm$^2$. The sliding speed was 0.5 m/s at a sliding surface temperature of 35° C. The frictional force and the decrease in the pin length were monitored and recorded by optical measuring arrangements. The measured quantity x stated in Table 2 corresponds to the quotient of the decrease in the pin length and the distance covered on the rotating steel disk.

The compositions of the molding materials and the results of the measurements are shown in the tables.

TABLE 1

Compositions of the examples according to the invention and comparative experiments

| Examples | Component A [% by weight] | Component B [% by weight] | Component C [% by weight] |
|---|---|---|---|
| 1 | 60 A | 40 | — |
| 2 | 60 A | 35 | 5 |
| 3 | 50 A | 45 | 5 |
| 4 | 50 A | 40 | 10 |
| 5* | 50 A/1V | 40 | 10 |
| 6* | 50 A/2V | 40 | 10 |
| 7* | 50 A/3V | 40 | 10 |

*for comparison

TABLE 2

| | Properties | | |
|---|---|---|---|
| Examples | Vicat A [°C.] | PEN [Nm] | x [μm/km] |
| 1 | 270 | 62 | 4 |
| 2 | 266 | 73 | 7 |
| 3 | 262 | 74 | 3 |
| 4 | 257 | 81 | 5 |
| 5* | 176 | 65 | 15 |
| 6* | 259 | 48 | 16 |
| 7* | 188 | 52 | 29 |

* for comparison

We claim:

1. A thermoplastic molding material containing
   A) from 5 to 95% by weight of a partly aromatic, semicrystalline copolyamide having a crystallinity of more than 30% and a triamine content of less than 0.5% by weight consisting essentially of
      $a_1$) from 30 to 44 mol % of units which are derived from terephthalic acid
      $a_2$) from 6 to 20 mol % of units which are derived from isophthalic acid
      $a_3$) from 43 to 49.5 mol % of units which are derived from hexamethylenediamine and
      $a_4$) from 0.5 to 7 mol % of units which are derived from aliphatic cyclic diamines of 6 to 30 carbon atoms,
      the molar percentages of components $a_1$) to $a_4$) together being 100% and
   B) from 5 to 95% by weight of a polyphenylene ether
   C) from 0 to 30% by weight of an elastomeric polymer,
   D) from 0 to 45% by weight of a fibrous or particulate filler or of a mixture thereof,
   E) from 0 to 20% by weight of a flameproofing agent and
   F) from 0 to 30% by weight of conventional additives and processing assistants selected from the group consisting of stabilizers, antioxidants, lubricants, mold release agents, dryer, pigments, plasticizers and mixtures thereof,
   the percentages A) to F) summing to 100%.

2. The thermoplastic molding material as claimed in claim 1, wherein
   A) is from 15 to 75% by weight,
   B) is from 20 to 80% by weight,
   C) is from 5 to 20% by weight,
   D) is from 0 to 35% by weight,
   E) is from 0 to 12% by weight and
   F) is from 0 to 30% by weight.

3. The thermoplastic molding material of claim 1, wherein the copolyamide A) is composed of
   from 32 to 40 mol % of $a_1$),
   from 10 to 18 mol % of $a_2$),
   from 46 to 48.5 mol % of $a_3$) and
   from 1.5 to 4 mol % of $a_4$).

4. The thermoplastic molding material of claim 1, wherein up to 50% by weight, based on B), of the polyphenylene ether B) is replaced by a vinylaromatic polymer of styrene, chlorostyrene, α-methylstyrene or p-methylstyrene or copolymers thereof with up to 20% by weight of (meth) acrylonitrile or (meth)acrylate.

5. The thermoplastic molding material of claim 1, wherein a modified polyphenylene ether which is obtained by reacting
   $b_1$) from 50 to 99.95% by weight of an unmodified polyphenylene ether,
   $b_2$) from 0 to 40% by weight of a vinylaromatic polymer,
   $b_3$) from 0.05 to 30% by weight of at least one compound selected from the group consisting of
      $b_{31}$) an α,β-unsaturated dicarbonyl compound,
      $b_{32}$) an amido-containing monomer having a polymerizable double bond and
      $b_{33}$) a lactam-containing monomer having a polymerizable double bond,
   $b_4$) from 0 to 5% by weight of a free radical initiator,
   the percentages by weight being based on the sum of $b_1$) to $b_4$),
   is used as component B).

6. The thermoplastic molding material of claim 5, wherein the component $b_3$) is maleic acid, fumaric acid or maleic anhydride.

7. A molding obtained from a molding material as defined in claim 1.

8. The thermoplastic molding material of claim 1, wherein the copolyamide A) has a crystallinity of more than 40%.

9. The thermoplastic molding material of claim 1, wherein the cyclic diamines $a_4$) are 1,3-cyclohexanediamine, 1,4-cyclohexanediamine, 1,4-cyclohexanediamine or isophoronediamine.

* * * * *

UNITED STATES PATENT AND TRADEMARK OFFICE
CERTIFICATE OF CORRECTION

PATENT NO. : 5,561,193

DATED : October 1, 1996

INVENTOR(S) : GOTTSCHALK et al.

It is certified that error appears in the above-indentified patent and that said Letters Patent is hereby corrected as shown below:

Column 14, claim 2, line 4, "as claimed in" should be --of--.

Signed and Sealed this

Twenty-fourth Day of December, 1996

Attest:

BRUCE LEHMAN

Attesting Officer

Commissioner of Patents and Trademarks